Sept. 1, 1959          L. B. WALKER          2,902,291

VEHICLE PNEUMATIC SUSPENSION SYSTEM

Filed July 17, 1957          3 Sheets-Sheet 1

Inventor
Lloyd B. Walker
by
Stevens, Davis, Miller, Mosher
his Attorneys

Sept. 1, 1959   L. B. WALKER   2,902,291
VEHICLE PNEUMATIC SUSPENSION SYSTEM
Filed July 17, 1957   3 Sheets-Sheet 2

United States Patent Office 2,902,291
Patented Sept. 1, 1959

2,902,291

VEHICLE PNEUMATIC SUSPENSION SYSTEM

Lloyd B. Walker, Port Arthur, Ontario, Canada, assignor to Canadian Car Company Limited, Montreal, Quebec, Canada Application July 17, 1957, Serial No. 672,504

Claims priority, application Canada August 3, 1956

6 Claims. (Cl. 280—124)

This invention relates to a pneumatic suspension system for a vehicle, that is to say a pneumatically cushioned connection between the chassis frame and each axle assembly on which the wheels of the vehicle are mounted. There have been a number of proposals in the past to provide vehicles with pneumatic suspension devices, but these have suffered from disadvantages of one kind or another. The object of the present invention is to provide an improved and simplified system.

One of the disadvantages of a pneumatic bellows unit is that, in common with a coil spring, it lacks strength in all directions other than along its central axis. Thus, as with coil spring suspension, it has in the past always been found necessary to provide a pneumatic suspension system with stabilizing rods or like rigid mechanical members extending between the chassis and the axle assembly in order to ensure sufficient rigidity in all directions transverse to the vertical. Rods are employed to hold the axle assembly relatively to the chassis in the forward direction of the vehicle (to absorb the braking and accelerating loads); in the transverse direction across the vehicle (to absorb forces set up on cornering); as well as so-called torque rods provided to absorb the torques resulting from acceleration and braking forces. These torques act in one direction or other about the axis of the wheel axle concerned. One commonly adopted form of member provided to absorb this type of load, is a hollow torque tube surrounding the transmission shaft and extending rearwardly from a fixed part on the forward part of the chassis to the differential housing which forms part of the rear axle assembly. Any tendency for the differential housing to rotate relatively to the chassis frame is thus checked. Other arrangements of torque rod for serving the same purpose have been developed.

The principal object of the present invention is to eliminate the need for such torque rods or tubes, or for any other equivalent rigid members provided to absorb the torques produced by accelerating and braking forces.

It has now been discovered that this torque can be absorbed by a pneumatic suspension system employing conventional bellows units, provided each unit is connected to an individual reservoir. Preferably, in order to obtain improved ride control each such connection is established through a constricted passageway.

Reference will now be made to the accompanying drawings for a description of specific examples of the invention.

Figure 1:
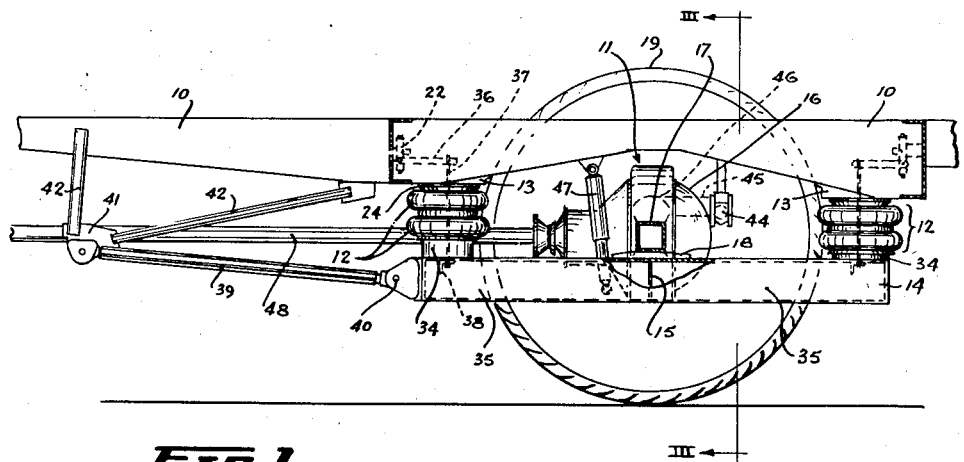
Figure 1 is a side elevation of one form of the invention applied to the rear axle assembly of an automotive vehicle.

The assembly seen in Figures 1–4 will be considered first. These views show the rear portion of the chassis 10 of an automotive vehicle. Arranged one on each side of such chassis 10 respectively in front of and behind a rear axle assembly 11 are four bellows units 12. At its upper end, each bellows unit 12 is secured by means of a suitable fixture 13 to the chassis 10 (see Fig. 1). The lower ends of the two bellows units 12 arranged on each side of the vehicle are connected together by a rigid hollow member 14 which serves as a rear perch for mounting that end of the rear axle assembly 11. As will appear from the subsequent description of the operation of the bellows units 12, each of these rear perches 14 serves the further purpose of providing air storage space for the bellows units. A partition 15 divides each of the perches 14 centrally of its longitudinal extent to form two independent air reservoirs 35 and thus isolate the forward and rear bellows units 12 pneumatically from one another.

The rear axle assembly 11 is conventional, consisting of a differential housing 16 and an axle housing 17. The axle housing 17 is secured at each end to the centre of one of the rear perches 14 by means of bracket assemblies 18. Wheels 19 are arranged in the usual manner on the ends of the rear axle assembly 11 outwardly of the rear perches 14.

Figure 4:
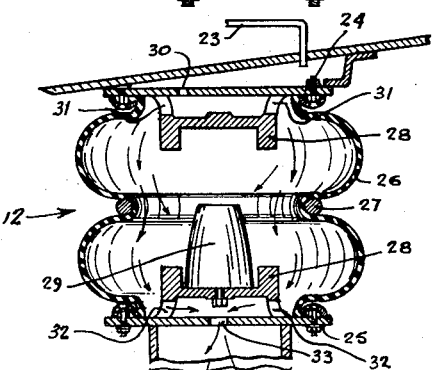
Figure 4 is an enlarged sectional view of a bellows unit as employed in the system shown in Figures 1, 2, and 3.

As best seen from Figure 2 the pneumatic system comprises a main supply pipe 20 leading from a supply tank (not shown in Figs. 1–4 but subsequently appearing in Fig. 6). This supply pipe 20 is branched off to four individual air supply pipes 21 leading each to a control valve 22. Further conduits 23 lead from each of the valves 22 to a bellows unit 12. Referring now to Figure 4 which shows an individual bellows unit, this will be seen to consist of an upper rigid circular plate 24 and a similar lower rigid circular plate 25, between which plates there is arranged a continuous, generally cylindrical, flexible envelope 26 of thick tough vulcanised rubber. The central portion of this envelope 26 is drawn inwardly by a metal ring 27 whereby to form a bulge in the envelope 26 above and below such ring and thus produce a bellows-like construction. Within the central cavity of the unit there are mounted on the upper and lower plates 24 and 25, a pair of bump pads 28 one of which carries a solid rubber pad 29. This rubber pad 29 projects from one of the bump pads 28, the lower bump pad 28 as illustrated in Figure 4, approximately half the axial length of the unit towards the other bump pad 28. These parts serve to limit compression of the bellows unit to approximately 50% of its normal condition as illustrated in the drawings.

It will be appreciated that the extent of expansion on the unit, bellows unit will depend upon the balance of forces existing on the unit, that is to say the downward static thrust of the weight of the vehicle and momentary loads caused by irregular road conditions, as balanced by the pneumatic forces exerted by the air which is forced under pressure into the unit from the conduit 23. This air enters the unit through an aperture 30 in the upper plate 24 and further apertures 31 in the base of the upper bump pad 28. The air can pass out of the unit through similar apertures 32 in the lower bump pad 28 and through an aperture 33 in the lower plate 25 leading to a rigid hollow connector 34 that serves to secure the lower plate 25 to the perch 14, and thence to the reservoir 35 in such perch 14.

Movement of each valve 22 is controlled through an operating arm 36 secured at its free end to a vertically depending rod 37, the lower end of each such rod being secured to an arm 38 rigidly attached to the adjacent perch 14.

Figure 2:
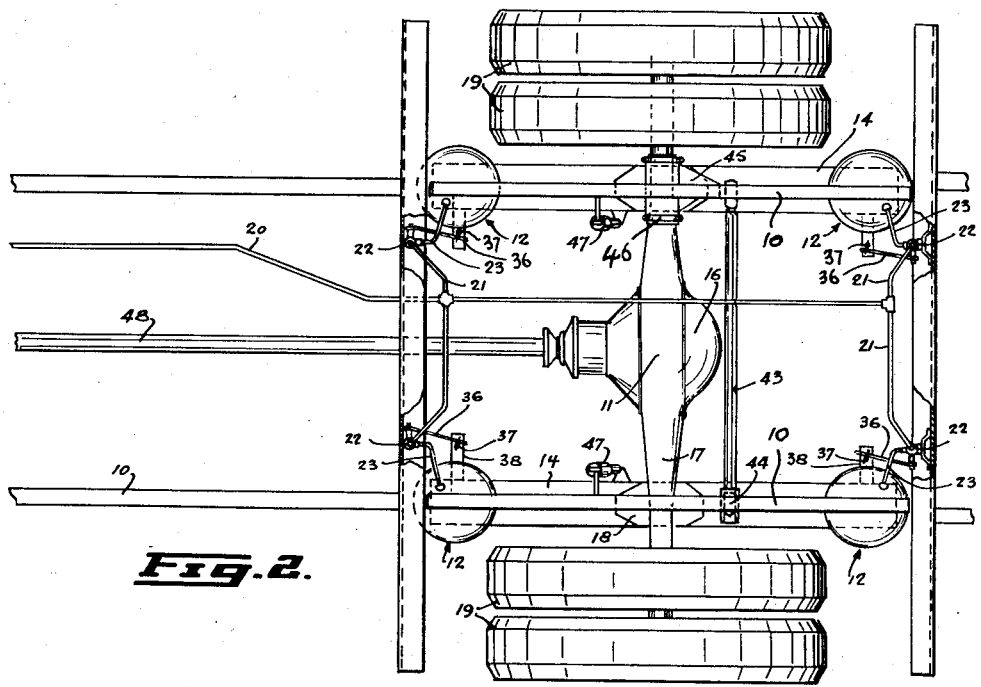
Figure 2 is a plan view of the parts seen in Figure 1.
Figure 3:
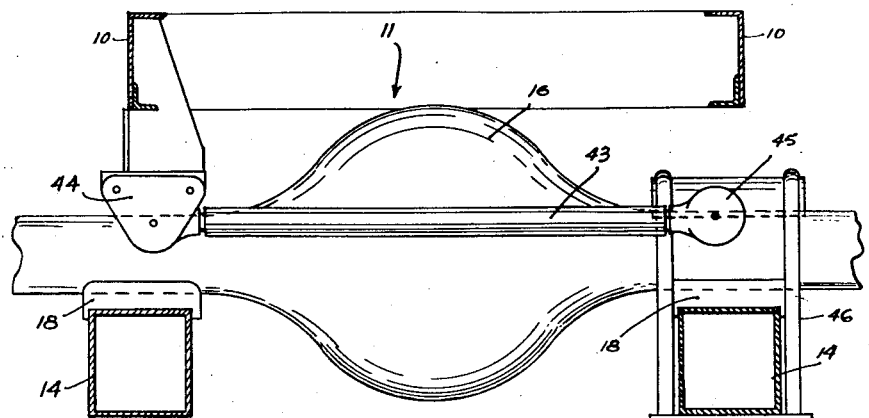
Figure 3 is a fragmentary section on the lines III—III in Figure 1.

Provision is made for stability of the rear axle assembly in the forward direction of the vehicle by means of a pair of rear radius rods 39 (see Fig. 1, these parts being obscured by the chassis 10 in Fig. 2). The rear end of each radius rod 39 is pivotally secured at 40 to the forward end of a perch 14 in a conventional manner, and its forward end is similarly pivotally secured to a bracket 41 that is secured in turn and in this case rigidly to the chassis 10 by radius rod hanger brackets 42.

To support the structure against the transverse forces experienced on cornering of the vehicle, there is provided a rear tracking rod 43 extending transversely across the vehicle just rearwardly of the differential housing 16. One end of the tracking rod 43 is pivotally connected to a bracket 44 secured to the chassis 10, while its other end is pivotally mounted by a conventional connection 45 to a bracket assembly 46 secured to the centre of the corresponding perch 14.

The connection of these radius rods and tracking rod to the chassis and axle assembly are entirely conventional, and accordingly have only been diagrammatically illustrated to avoid complexity in the diagrams. In addition, conventional shock absorbers 47 are shown extending between the chassis 10 and each perch 14.

The valves 22 serve as a level control by virtue of their connection to the rear axle assembly through the rods 37. It will be evident from consideration of Figure 1 that should any one of the bellows units 12 be provided with insufficient air at any time, the effect will be an upward movement of the corresponding rod 37 which will move the control valve 22 to introduce additional air into the unit concerned. Conversely, if the unit contains excess air from that required to balance the load of the vehicle and maintain the required vertical spacing between the rear axle assembly 11 and the chassis 10, the rod 37 will drop sufficiently to allow the control valve 22 to permit air to flow out of the unit concerned to atmosphere. Such levelling valves 22 permit achievement of one of the principal advantages of pneumatic suspension systems in automotive vehicles, that is the maintenance of an accurate level regardless of the amount and distribution of vehicle load. This is particularly important in public vehicles such as buses, where the load varies between extreme limits. It has always been found difficult with conventional springs to arrange that the step of the bus should not be too high for convenience of passengers entering and leaving the bus when the load is light, while assuring that the step is not too low when the bus is heavily loaded. The levelling valves 22 ensure a uniform chassis level in relation to the ground at all times by simply increasing the air pressure in the bellows units 12 as the load in the vehicle increases. This feature has been employed in prior pneumatic systems and forms no part of the present inventive advance, for which reason it has not been deemed necessary to provide detailed illustration of the type of valve that is employed. Numerous designs of valves have already been manufactured for this purpose. It is essential that these valves should embody some time delay characteristic in that it is not desired to inflate and deflate the bellows merely as a result of momentary changes of level consequent upon the encountering of irregular road surfaces. There should be a delay of operation of a period greater than any normally encountered as a result of bumps or holes in the road. For example, the levelling valves 22 may be made sensitive only to a change in elevation of the control arms 36 that persists constantly for a period in excess of say 10 seconds.

As previously explained, the advance that it is believed has been made by means of the present invention is the elimination of any need for torque rods or the like. It will be clear that when the vehicle is accelerating, the turning moment about the longitudinal axis of the axles of the rear axle assembly will tend to depress the front two bellows units 12 and expand the rear bellows units 12. That is to say the rear axle assembly 11 will tend to rotate clockwise relatively to the chassis 10, as seen in Figure 1. Conversely, under braking forces there will be a tendency for an anticlockwise rotation of the rear axle assembly relatively to the chassis. It has hitherto been thought essential to provide some form of stabilizing means for countering these forces. One of the most common such means has been a rod in the form of a hollow torque tube extending from the differential housing forward to the gear box or other unit through which the driving power is transmitted from the engine to the rear axle. It has now been discovered, however, that such a torque tube can be eliminated, and it will be observed in Figures 1 and 2 that the transmission shaft 48 leading to the rear axle assembly is shown without any such surrounding torque tube. The reason that these braking and accelerating torques can be absorbed in the pneumatic suspension system, lies in the particular construction of the bellows units 12 and in the arrangement of a reservoir 35 interconnected therewith, and in the division of each perch 14 into two reservoirs 35 through the means of the partition 15 which thus prevents air flow between the two reservoirs 35. When a braking torque is applied to the system, a small rotation of the axle in an anticlockwise direction occurs which results in a rise of air pressure in the rearmost bellows 12 and a corresponding reduction in the front bellows 12. The differential in pressure between the two bellows causes a restoring torque to be applied to the axle in a clockwise direction which equalizes the braking torque preventing further rotation of the axle.

The constricted passageway defined by the apertures 32 and 33, principally the latter, which thus restrict air flow between the bellows unit 12 and its reservoir 35, is provided principally as means of ride control. The actual size of these apertures will not be critically related to the size of the bellows or reservoir. In the construction shown in Figures 1–4, the aperture 33 is a circular hole of ¾" diameter. This could be reduced down to a size of the order of ⅜", but any reduction below that size would represent virtual isolation of the unit from its reservoir, and would result in an objectionably high frequency of oscillation when the vehicle was travelling over irregular road surfaces. It is anticipated that it might be practical to increase the aperture size up to say 1½" diameter, but any greater increase would effectively eliminate the constriction and provide insufficient ride control. In the construction illustrated in the drawings, the ratio of volume of each reservoir 35 to the volume of its corresponding bellows unit 12 is of the order of between 2 and 3 to 1. It makes little difference if the capacity of the reservoir 35 is increased, and the upper limit of this ratio will principally be determined by structural considerations, but if a ratio less than 2 to 1 is employed there is again a tendency for the frequency oscillation of the system to become objectionably high and uncomfortable to the passengers of the vehicle.

Figure 7:
Figure 7 is a fragmentary sectional view on the lines VII—VII in Fig. 5.
Figure 7:
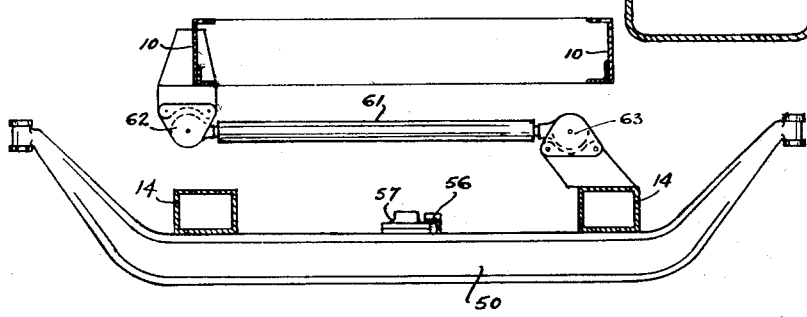
Figure 5:
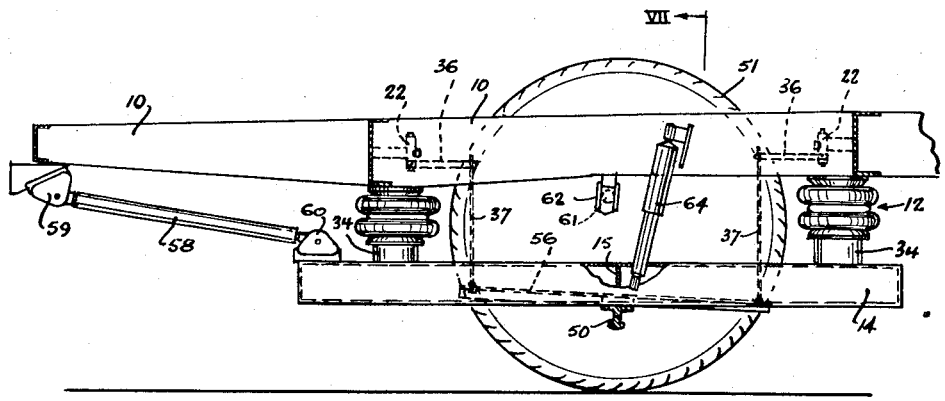
Figure 5 is a side elevation of a modified form of the invention, shown in this case as applied to the front wheel assembly of an automotive vehicle.
Figure 6:
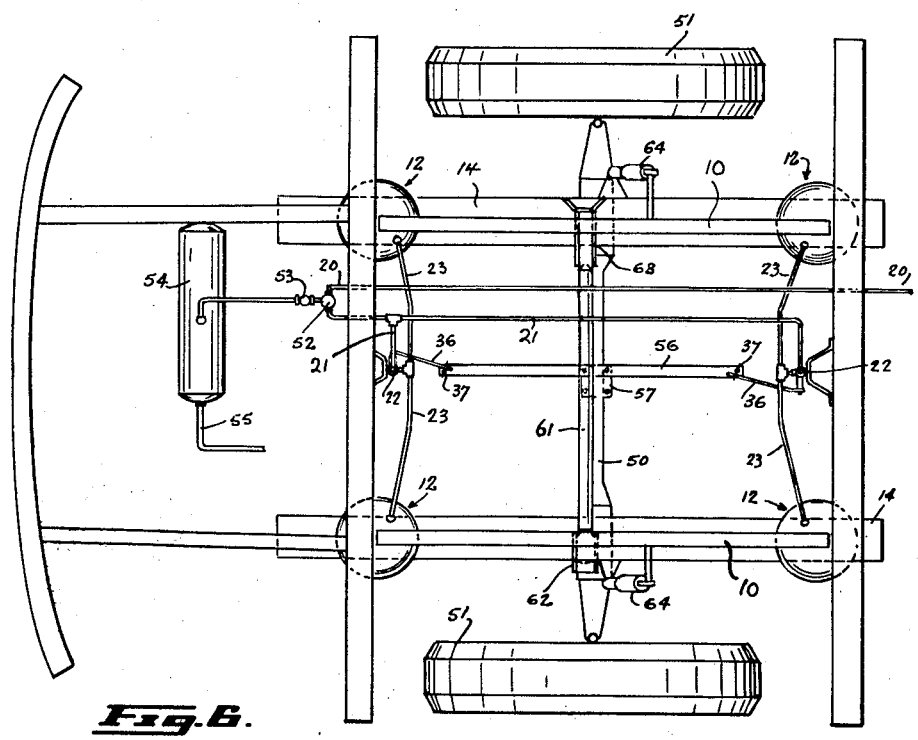
Figure 6 is a plan view of the parts seen in Figure 5.

Figures 5, 6 and 7 show essentially the same type of system applied to the front axle assembly of a vehicle which is assumed to be the same vehicle as that partially illustrated in Figures 1 to 4.

As before, the front axle 50 is secured to the forward part of the chassis 10 by being rigidly fixed at each end to the central portion of a front perch 14. Each end of each perch 14 carries a bellows unit 12 similar to that previously illustrated in detail in Figure 4, except that variations occur in the length of the connectors 34 to suit particular requirements of the vehicle level at this point. Wheels 51 are secured at each end of the front axle 50, the steering mechanism having been omitted from the drawings for simplicity of illustration.

As before, each bellows unit 12 is supplied with pressure air through a conduit 23 leading from a level control valve 22. In this arrangement, however, a single valve 22 is employed to control a pair of bellows units 12, rather than provide individual valves for each unit as at the rear end of the vehicle. This is necessary at the front end of the vehicle because if four levelling valves were placed adjacent to the outboard ends of the axle and the vehicle were parked with say the right rear wheel standing on a bump, depressing the bellows at this corner, the corresponding levelling valve would supply air to restore the normal bellows height. This would have the effect of depressing the diagonally opposite front wheel corner which in turn would demand air. This process would continue with the two remaining corners adjusting themselves accordingly until the system had jacked itself up to the maximum height limit. Placing the two front levelling valves close together provides, in effect, a three-point suspension which prevents the occurrence of the condition described.

Each of the two valves 22 is supplied through a supply pipe 21 which together with the pipe 20 is fed through a filter 52 and check valve 53 from a main air tank 54. The required air pressure will be maintained in the tank 54 at all times by a supply of air through conduit 55 from an air compressor (not shown). Only two rods 37 are required for controlling the control arms 36 of the two level control valves 22 and the lower ends of these rods 37 are connected to a beam 56 that extends in the longitudinal direction of the vehicle approximately centrally in the transverse direction. The central part of the beam 56 is secured by a bracket 57 to the front axle 50.

A front radius rod 58 is provided as before extending between pivotal connections 59 and 60 on the chassis 10 and the front end of each front perch 14 respectively. Front tracking rod 61 is also provided extending transversely across the vehicle, again between pivotal connections 62 and 63 on the chassis 10 and one of the perches 14 respectively. Shock absorbers 64 are also provided at each end of the axle 50.

I claim:

1. In a vehicle; a chassis; an axle assembly; and a suspension system connecting said chassis and axle assembly, said axle assembly including a pair of elongated rigid hollow members extending parallel with the longitudinal axis of the vehicle and arranged one on each end of the axle assembly, each such hollow member having a central partition dividing said member into a forward compartment and a rearward compartment, said suspension system comprising four bellows units positioned one on each side of said chassis respectively forwardly and rearwardly of said axle assembly, one end of each bellows unit being rigidly connected to said chassis and the other end of each said bellows unit being secured to an end of one of said hollow members in a manner permitting communication between the lower end of said bellows unit and the compartment formed within such end of said hollow member, and each bellows unit incorporating an aperture for restricting passage of air between such unit and its associated said compartment, a tank of pressure air, conduit means interconnecting said tank and each of said bellows units, valve means associated with said conduit means to control the flow of pressure air from said tank into said bellows units and from said bellows units to atmosphere, and means controlling said valve means sensitive to sustained changes in the vertical spacing between said chassis and said axle assembly and effective on said valve means to control the flow of air into and out of said bellows units to maintain said spacing substantially constant irrespective of fluctuation of vehicle load.

2. In a vehicle; a chassis; an axle assembly; and a suspension system connecting said chassis and axle assembly, said axle assembly including a pair of elongated rigid hollow members extending parallel with the longitudinal axis of the vehicle and arranged one on each end of the axle assembly, each such hollow member having a central partition dividing said member into a forward compartment and a rearward compartment, said suspension system comprising four bellows units positioned one on each side of said chassis respectively forwardly and rearwardly of said axle assembly, one end of each bellows unit being rigidly connected to said chassis and the other end of each said bellows unit being secured to an end of one of said hollow members in a manner permitting communication between the lower end of said bellows unit and the compartment formed within such end of said hollow member, and each bellows unit incorporating an aperture for restricting passage of air between such unit and its associated said compartment, a tank of pressure air, conduit means interconnecting said tank and each of said bellows units, valve means associated with said conduit means to control the flow of pressure air from said tank into said bellows units and from said bellows units to atmosphere, means controlling said valve means sensitive to sustained changes in the vertical spacing between said chassis and said axle assembly and effective on said valve means to control the flow of air into and out of said bellows units to maintain said spacing substantially constant irrespective of fluctuation of vehicle load, and stabilising means connected between the chassis and axle assembly for resisting forces tending to effect relative moment of the chassis and axle assembly in the forward and transverse directions of the vehicle only, said bellows units comprising the sole means resisting any torque tending to cause relative rotation of the chassis and axle assembly about the longitudinal axis of the axles of said axle assembly.

3. In a vehicle; a chassis; an axle assembly; and a suspension system connecting said chassis and axle assembly, said suspension system comprising at leat one bellows unit positioned forwardly of said axle assembly and at least one bellows unit positioned rearwardly of said axle assembly, an individual reservoir connected to each such bellows unit, means for supplying pressure air to each said bellows unit and stabilizing means connected between the chassis and axle assembly for resisting forces tending to effect relative movement of the chassis and axle assembly in the forward and transverse directions of the vehicle only, said bellows units comprising the sole means resisting any torque tending to cause relative rotation of the chassis and axle assembly about the longitudinal axis of the axles of said axle assembly, wherein said means for supplying pressure air to each said bellows unit includes a conduit leading to each said unit, a valve controlling flow of air along said conduit, and means operable on said valve sensitive to the vertical spacing between said chassis and said axle assembly, said means being effective to maintain said spacing substantially constant by the admission of air to or drainage of air from said bellows unit.

4. In a vehicle; a chassis; an axle assembly; and a suspension system connecting said chassis and axle assembly, said suspension system comprising a pair of bellows units positioned respectively one on each side of said vehicle and both forwardly of said axle assembly and a pair of bellows units positioned respectively one on each side of said vehicle and both rearwardly of said axle assembly, an individual reservoir connected to each said bellows unit, means for supplying pressure air to each bellows unit, and stabilising means connected between the chassis and axle assembly for resisting forces tending to effect relative movement of the chassis and axle assembly in the forward and transverse directions of the vehicle only, said bellows units comprising the sole means resisting any torque tending to cause relative rotation of the chassis and axle assembly about the longitudinal axis of the axles of said axle assembly, wherein said means for supplying pressure air to each said bellows unit includes a conduit leading to each said unit, a valve controlling flow of air along said conduit, and means operable on said valve sensitive to the vertical spacing between said chassis and said axle assembly, said means being effective to maintain said spacing substantially constant by the admission of air to or drainage of air from said bellows unit.

5. In a vehicle; a chassis; an axle assembly, and a suspension system connecting said chassis and axle assembly, said suspension system comprising at least one bellows unit positioned forwardly of said axle assembly and at least one bellows unit positioned rearwardly of said axle assembly, an individual reservoir connected to each such bellows unit, a constricted passageway between each bellows unit and its associated reservoir, means for supplying pressure air to each said bellows unit, and stabilising means connected between the chassis and axle assembly for resisting forces tending to effect relative movement of the chassis and axle assembly in the forward and transverse directions of the vehicle only, said bellows units comprising the sole means resisting any torque tending to cause relative rotation of the chassis and axle assembly about the longitudinal axis of the axles of said axle assembly, wherein said means for supplying pressure air to each said bellows unit includes a conduit leading to each said unit, a valve controlling flow of air along said conduit, and means operable on said valve sensitive to the vertical spacing between said chassis and said axle assembly, said means being effective to maintain said spacing substantially constant by the admission of air to or drainage of air from said bellows unit.

6. In a vehicle; a chassis, an axle assembly; and a suspension system connecting said chassis and axle assembly, said suspension system comprising a pair of bellows units positioned respectively one on each side of said vehicle and both forwardly of said axle assembly and a pair of bellows units positioned respectively one on each side of said vehicle and both rearwardly of said axle assembly, an individual reservoir connected to each said bellows unit, a constricted passageway between each bellows unit and its associated reservoir means for supplying pressure air to each bellows unit, and stabilising means connected between the chassis and axle assembly for resisting forces tending to effect relative movement of the chassis and axle assembly in the forward and transverse directions of the vehicle only, said bellows units comprising the sole means resisting any torque tending to cause relative rotation of the chassis and axle assembly about the longitudinal axis of the axles of said axle assembly, wherein said means for supplying pressure air to each said bellows unit includes a conduit leading to each said unit, a valve controlling flow of air along said conduit, and means operable on said valve sensitive to the vertical spacing between said chassis and said axle assembly, said means being effective to maintain said spacing substantially constant by the admission of air to or drainage of air from said bellows unit.

References Cited in the file of this patent

UNITED STATES PATENTS

| | | |
|---|---|---|
| 1,721,732 | Hawkins | July 23, 1929 |
| 2,180,860 | Brown | Nov. 21, 1939 |
| 2,691,420 | Fox | Oct. 12, 1954 |
| 2,742,301 | Pointer | Apr. 17, 1956 |